Oct. 21, 1969  W. H. BLACK ET AL  3,473,362
CONNECTOR PLATE FOR JOINING WOOD MEMBERS AND METHOD
AND APPARATUS FOR MAKING SAME
Original Filed Oct. 24, 1965                2 Sheets-Sheet 1
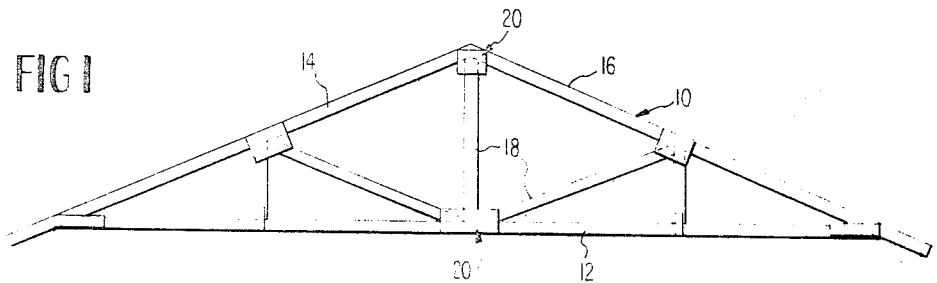
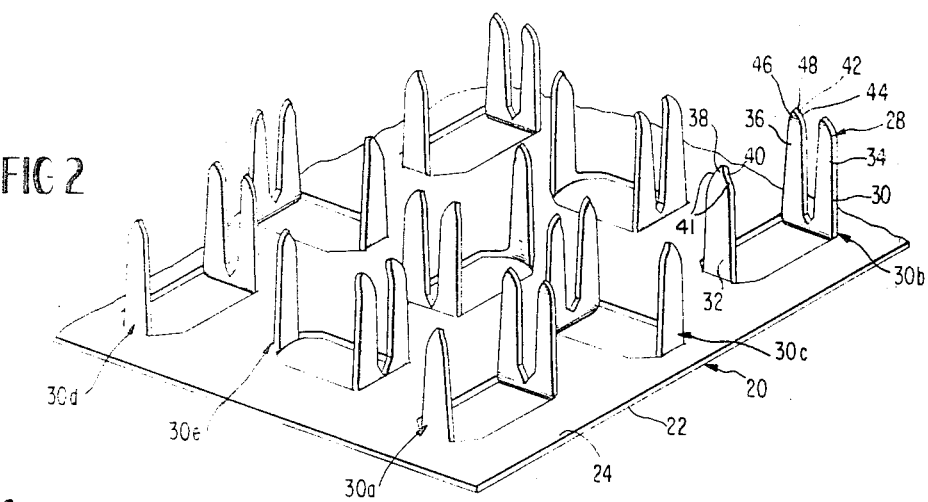
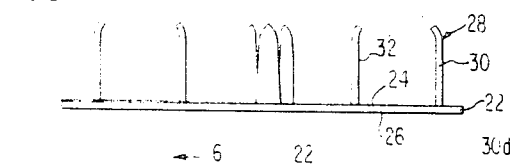
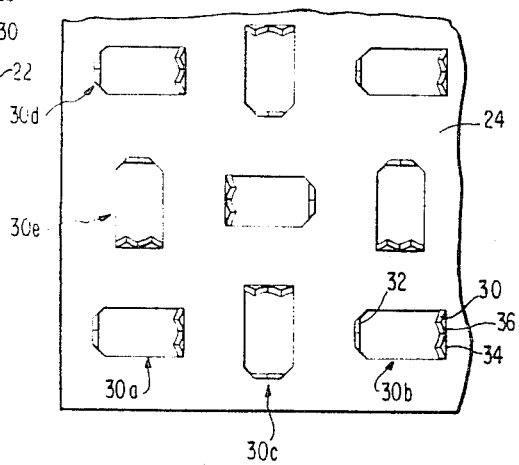
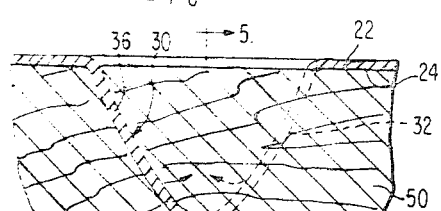
INVENTORS
WILLIAM HILL BLACK
WILLIAM HILL BLACK, JR.
BY *Irvine and Smiley*
ATTORNEYS

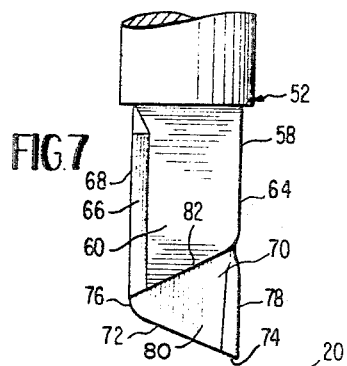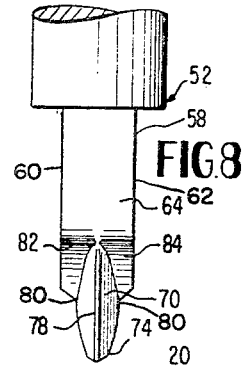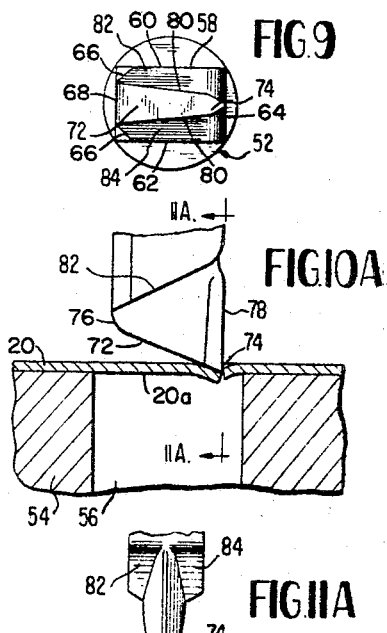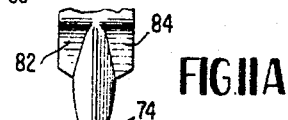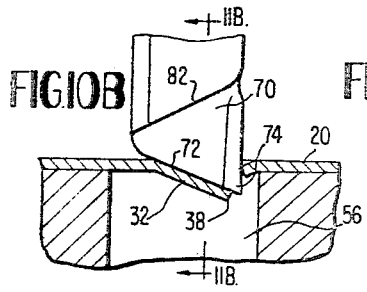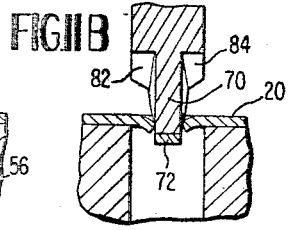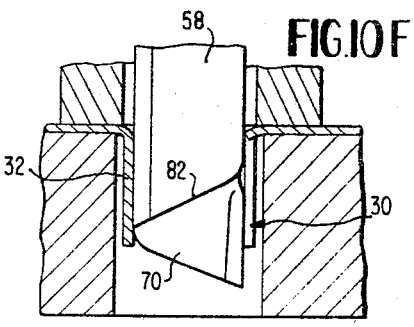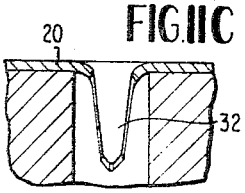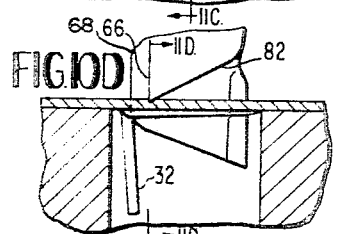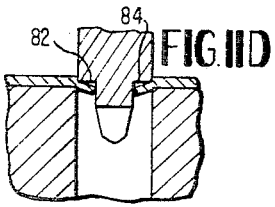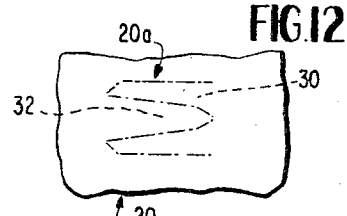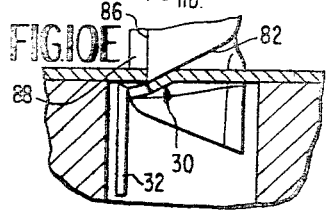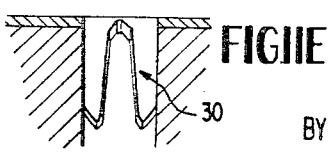

United States Patent Office 3,473,362
Patented Oct. 21, 1969

3,473,362
CONNECTOR PLATE FOR JOINING WOOD MEMBERS AND METHOD AND APPARATUS FOR MAKING SAME
William Hill Black and William Hill Black, Jr., both of 1240 NE. 204th Terrace, North Miami Beach, Fla. 33162
Original application Oct. 24, 1965, Ser. No. 504,695. Divided and this application Apr. 25, 1968, Ser. No. 753,320
Int. Cl. B21d 28/10; B21g 3/08
U.S. Cl. 72—326
6 Claims

ABSTRACT OF THE DISCLOSURE

A punch having multiple side by side angularly disposed punching surfaces for successively punching a plurality of spaced projections from a continuous area of sheet material in one stroke of said punch.

---

This application is a division of application 504,695, filed Oct. 24, 1965, now Patent 3,382,752.

The present invention generally appertains to improvements in connector means for joining together wood members and specifically relates to a new and novel connector plate and method and apparatus for producing such plate.

The connector plate of the present invention is of the general type for use with wooden structure members to securely tie together and hold juxtaposed wooden members of a structural assembly, such as a truss.

Connector plates or gussets, which are formed from metal plates, are known wherein the plates are formed with a plurality of teeth punched therefrom and extending perpendicularly from one side of such plate. It has been prepared to provide connector plates of the type described with a plurality of teeth which are of generally triangular configuration and which are grouped in various arrangements.

Heretofore, it has been necessary to form a desired tooth and a plurality of such teeth in several punching operations. Obviously, this is an expensive procedure which requires a delicate operation and which requires skill.

Furthermore, such plates, with known teeth and teeth arrangements, do not have the single tooth unit formed, and a plurality of the tooth units related to each other, in such a way that the teeth of one tooth formation cooperate and the tooth formations cooperate with each other to clinch the fibers of the wooden structure in a positive engagement when the teeth are driven into the wooden structure.

In addition, in carrying out the known methods for forming the connector plates, two separate and distinct punches must be utilized.

Accordingly, an important object of the present invention is to overcome the disadvantages, attendant with known connector plates and the method and apparatus for producing the same, by providing a novel connector plate and a novel and simple method and apparatus whereby tooth formations of the connector plate may be formed in a convenient manner.

Therefore, an important object of the present invention is to provide a novel method of producing a connector plate including a novel punching operation, whereby the tooth formations are struck out from the plate in a single punching operation.

Another important object of the present invention is to provide a novel punch which is formed so as to simultaneously form a struck out bifurcated tooth and a confronting plain tooth or tang from a section of a metal plate, the companion and confronting bifurcated tooth and tang being simultaneously formed by virtue of the construction and formation of the punch.

Another important object of the present invention is to provide a punch, which not only forms the companion teeth of a single tooth formation or unit in a single punching operation but also forms them in such a manner that they cooperate together to grip a section of a piece of wood and so that the logs or bifurcations of the bifurcated tooth cooperate together to assume a particular gripping engagement, relative to the grain of a piece of wood, when the teeth are driven into the piece of wood.

In this regard, an important feature of the present invention is to provide a connector plate, which consists of a relatively thin metal plate from which a tooth unit is struck, the tooth unit including the bifurcated tooth and a single tooth or tang, the single tooth or tang confronting the space between the bifurcation or legs of the bifurcated tooth and the tang and bifurcated tooth being substantially parallel; with the extremities of the bifurcations of the bifurcated tooth being so formed that, when the tooth unit is driven into a piece of wood, the bifurcations or legs tend to move toward each other into a certain angular relationship, so as to grip a section of the wood and the legs and tang being so formed that they grip a section of the wood in a direction substantially transverse of the gripping action of the legs.

A further important object of the present invention is to provide a connector plate having a plurality of tooth units of the foregoing type, with the tooth units being so related to each other, in a particular pattern, that there is no possibility of the plate buckling, under tension or compressive stresses, or the teeth becoming sheared or dislodged from wooden members and so that the tooth units, each in and of itself and in united cooperation, grip sections of wooden members, which the plate joints together, in a crossed relationship whereby withdrawal of the tooth units or shearing of the wood fibers is obviated.

A further important object of the present invention is to provide a simply constructed, sturdy, inexpensive and durable connector plate, which can be easily driven into a wooden member and which will join two juxtaposed wooden members together in a sturdy relationship, providing a positive and durable joint wherein the plate will be resistant to buckling and withdrawal tensions.

A further object of the present invention is to provide a very efficient, inexpensive and easily practiced method of forming a connector plate of the foregoing type which method does not require the exercise of undue skill and the employment of skilled labor.

A still further object of the present invention is to provide a sturdy, inexpensive, and novelty constructed punch which will form the particular tooth formations unit and formations of the tooth units in accordance with the novel and simple method.

The foregoing and ancillary objects and structural features of merit are attained by this invention, the preferred embodiment of which is set forth in the following description and illustrated in the accompanying drawings, wherein:

FIG. 1 is a side elevational view of a wood truss having connector plates at the joints, the plates being formed in accordance with the teachings of the present invention;

FIG. 2 is a perspective view of a portion of the plate, illustrating the particular formation of a single tooth unit or assembly and the formation and pattern arrangement or relationship of the tooth units or assemblies to each other;

FIG. 3 is a plan view of the connector plate of FIG. 2;

FIG. 4 is a side elevational view thereof;

FIG. 5 is a vetrical section, taken on line 5—5 of FIG. 6 perpendicular to the plane of the connector plate, and showing, in detail, the relationship of the bifurcations or legs of the bifurcated tooth in their embedded positions in a wood member;

FIG. 6 is a cross-sectional view taken on line 6—6 FIG. 5, and showing generally the relationship between the bifurcated tooth and the single companion tooth or tang, in the engaged relationship of the tooth unit in a wood member;

FIG. 7 is a side-elevational view of the punch, in accordance with the present invention, showing the same in working relation with a metal plate and a die;

FIG. 8 is an end elevational view of the punch;

FIG. 9 is a bottom plan view of the punch;

FIGS. 10a–11e are side and end, somewhat diagrammatic, illustrations of the method steps and showing the punch in its use in forming the tooth structure, and;

FIG. 12 is a fragmentary plan view of a portion of the plate, showing in outline the form of a single tooth unit.

Referring now more particularly to the accompanying drawings, and initially to FIGS. 1–6, for a clear understanding of the construction and formation and appearance of the connector plate and one of its environmental uses in the joining together of juxtaposed wooden members, FIG. 1 illustrates a truss 10, which is composed of top and bottom chord members and strut members connected together in coplanar relationship. The bottom chord member 12 and the top chord members 14 and 16 are connected together by strut members 18 by means of connector plates 20, which are formed in accordance with the present invention. The chord members and strut members may be of standard size wood, such as 2 x 4's. The particular truss 10 is shown for environmental purposes only, as the members of any type truss or structural member can be joined together by means of the connector plates 20. Also, the connector plates may be used to join together the juxtaposed portions of wooden members for any desired purpose.

The connector plate 20, as shown in FIGS. 2–4, includes a body or piece of sheet material 22, which has opposing plain or flat surfaces, such as the inner surface 24 and the outer surface 26. It is envisioned that the connector plate can be bent, so that it will have angular sections, which are flat.

The plate is formed, in accordance with the method of the present invention and by means of the apparatus disclosed herein, with a plurality of particular tooth units or formations 28. A single tooth unit, which is formed by having a portion of the plate struck out from the body of the plate so that the tooth unit is arranged perpendicular to the inner flat surface 22, includes a complementary or companion tooth 30 and a tooth or tang 32. The tooth 30 is bifurcated, so that it is composed of bifurcations or legs 34 and 36 and the tang 32 is disposed substantially parallel to the tooth 30 and is in confronting relation with the space between the bifurcations or legs of the tooth 30.

The tang or tooth 32, as shown in FIGS. 2 and 4, is of triangular shape and terminates in a free pointed extremity 38 that constitutes the piercing tip of the tang and which is bent slightly inwardly, as at 40. The triangular piercing tip or extremity 38 has converging side edges 40.

The legs 34 and 36 of the bifurcated tooth 30 are formed, as will be described, simultaneously with the tang 32, the latter being formed from the portion of the material of the plate that lies between the legs 34 and 36, whereby the spacing between the legs 34 and 36 is realized. The legs 34 and 36 have identically shaped free ends or extremities 42, which have straight inner edges 44 and inwardly angled outer edges 46, the edges terminating in a piercing point 48. The extremities 42 are bent inwardly, relative to the tang or tooth 32, as shown clearly in FIG. 4.

Due to the formation of the legs of the bifurcated tooth, particularly with respect to the outer extremities or free ends thereof, the legs, when the tooth unit is driven into a piece of wood 30, as shown in FIGS. 5 and 6, tend to move inwardly toward the tang or leg 32, which also tends to move slightly inwardly because of the inwardly bent shape of its tip or edge 40. Thus, as shown in FIG. 6, the bifurcated tooth 30 and the tooth or tang 32 cooperate to grip a section of the wood.

In addition, the legs of the bifurcated tooth, due to the fact that they have the specific inner edges 44 and the outer extremities or edges, as shown in FIG. 5 whereby the legs 34 and 36 grip a section of the wood, as shown in FIG. 5. This establishes a cross-gripping action, that is, the tooth unit grips a section of the wood in a longitudinal and a transverse direction.

Thus, there is a double gripping action, namely, that resulting from the cooperative piercing and gripping relation between the bifurcated tooth 30 and the tang 32, as shown in FIG. 6, and in that between the legs or bifurcations 34 and 36 of the bifurcated tooth as shown in FIG. 5. This insures that the tooth unit 28 will securely grip a section of the wooden member 50, when the tooth unit is pressed into the wood, so as to reduce splitting of the wood and tearing of the wood fibers to realize an efficient gripping of the wood, without shearing of the tooth unit and without any undue strain placed thereon. In addition, it insures that the tooth unit will be resistant to lateral shear resistance and withdrawal resistance, without chopping the wood grain and in a manner to effectively grip a portion of the wood.

In order to further effect and realize the foregoing results and advantages, the tooth units are formed in a particular arrangement as shown in FIGS. 2 and 3.

Considered in a longitudinal direction of the plate 22 the tooth unit 30a and the tooth unit 30b are disposed in spaced relation so that the teeth of each unit are in parallelism. The tooth unit 30c is interposed between the parallel tooth units 30a and 30b and the teeth thereof are disposed at right angles to the teeth of the units 30a and 30b. The teeth units 30a and 30b are in longitudinal alignment and longitudinal spaced parallel relationship with the interposed tooth unit 30c being transverse to the units 30a and 30b and transverse to the longitudinal axis of the plate.

Transversely of the plate, the tooth unit 30a and the tooth unit 30d are spaced apart, with the tooth unit 30e interposed between. The teeth unit 30e is parallel with the teeth unit 30c, while the tooth units 30a and 30d are in lateral alignment, that is, the tangs or legs 32 of the tooth units 30a and 30d lie in the same transverse plane of the plate, while the bifurcated tooth units 34 of the tooth unit 30a and 30d lie in the same transverse planes of the plate. The tooth unit 30e is in a plane that passes between the open space between the teeth of the tooth units 30a and 30d, while the tooth units 30a and 30b are in a longitudinal plane that passes through the space between the teeth of the tooth unit 30c.

In other words, the relationship of the tooth units is such that, in a longitudinal direction, every other tooth unit is in parallel relation with the interposed tooth units such as the tooth unit 30c, being transverse. On the other hand, from a lateral view point of the plate, the tooth units 30a and 30d are in alignment, with the tangs of each unit being in parallel alignment and with the bifurcated tooth of each unit being in lateral alignment and with the tooth unit 30e being parallel to the tooth unit 30c and being disposed along the longitudinal axis of the plate. Thus, adjoining tooth units are in right angular relation, considered in one direction of the plate and then in a direction transverse to the one direction.

By virtue of such relationship, it can be appreciated that the tooth units will grip differing portions of the wood member, with respect to the grain thereof, so as to insure that the connector plate is securely fastened to the wood member and is fastened so as to not be affected by lateral or withdrawal stresses, that is shear or pullout.

The apparatus, which is used for forming the connector plate 22, as shown in FIGS. 1 to 6, is illustrated in detail in FIGS. 7 to 12 and, particularly, in FIGS. 7 to 9. The apparatus includes a punch 52, which cooperates with a die 54, having a die opening 56 that is of a shape and cross sectional area to reecive the punch and the material of the plate with considerable latitude to compensate for various thickness of the plate.

For the sake of simplicity, only one punch has been illustrated but it is obvious that a plurality of punches, which are identical to the punch 52, will be carried by a support member and will be arranged in parallel and transverse relationship so as to effect the arrangement of the tooth units, as shown in FIGS. 2 and 3, in one punching operation and that the die will have corresponding openings to receive the punches.

For the sake of simplification of disclosure, the common supporting means for the plurality of punches and actuating means, such as hydraulic ram or the like, have not been illustrated but it will be obvious to those skilled in the art as to how the punches can be carried by a supporting member and driven into the die openings 56, through the plate 22, which rests on the die, so as to form the struck out tooth units.

The punch 52 comprises a forming end portion 58, which is substantially rectangular in cross section with the die opening 56 being substantially of the same shape and of greater cross sectional dimensions than the forming portion 58. The forming portion 58 has opposing flat side walls 60 and 62 and a flat end wall 64. The edges of the side walls 60 and 62 at their juncture with the side wall 64 are at right angular relationship thereto, while the juncture edge portions 66 between the end wall 68 and the side walls 60 and 62 are beveled, as shown clearly in FIGS. 7 and 9.

The forming portion has a reduced end portion 70, which has a free piercing end 72, which lies in a plane at an acute angle to a plane transversely intersecting the forming portion, above the lower end portion 70. The end 72 has a lower piercing point of edge 74 and a rearward rounded heel portion or edge 76 which joins with the rearward wall 68.

The front wall 78 of the lower end portion is beveled so that it has a sharp edge that extends from the edge 74 upwardly. The end portion is reduced in width, so as to form on opposite sides of its side walls 80 forming shoulders 82 and 84. The shoulders 82 and 84 are inclined upwardly away from the heel portion 76, so that the shoulders form with the end 72 a V formation, the apex of which is at the heel portion 76.

It is to be particularly noted that the end 72 is disposed in an acute angle to a transverse plane passing through the forming body portion, the angle being slightly greater than 20° and less than 25° and being preferably 22°. Also, it is to be noted that the shoulders are inclined upwardly in an opposite direction from the inclination of the end 72 and that the shoulders 82 and 84 are coplanar and that they are disposed, in their angle of inclination, at an acute angle, relative to the line passing through the forming portion from one end wall to the other, such angle being slightly greater than 25° but less than 30° and being preferably 26°.

The reason for the specific angular relationship will be appreciated in the detailed explanation of the method for forming the tooth unit, as will be described in the following with regard to FIGS. 10a–12e.

In carrying out the method, the flat plate 20 is superimposed on the die 54 as that portions 20a (FIG. 12) thereof overlie the die openings 56 and underlie the punches.

For the sake of simplification, the method will be related to the formation of a single tooth unit with the use of one punch and die opening.

As shown in FIGS. 10a and 11a, the piercing tip 74 first enters the plate and separates, while simultaneously forming it, the tip 38 of the tang 32 from the plate.

Further downward movement of the punch (FIGS. 10b and 11b) brings the end 72 into contact with the plate and causes the tang to be formed further.

In the further forming movement of the punch (FIGS. 10c and 11c), the heel edge 76 moves into contact with the plate to complete the striking out of the tang 32 and then (FIGS. 10d and 11d) the further progressive movement of the forming portion of the punch into the die opening brings the lower edges of the shoulders 82 and 84 into contact with the plate. The lower end of the end wall 66 also comes into contact with the plate and with the shoulders completes the formation of the tang.

As shown in FIGS. 10e and 11e, the shoulders then come into full contact with the plate and commence to punch out the legs of the bifurcated teeth 30. The forming portion of the punch in its further movement into the die opening (FIG. 10f) completes the forming of the legs, (FIG. 11e).

Thus, briefly recapitulating and bearing in mind that the forming portion of the punch moves through the plate into the die opening very quickly and forceably the tip 74 of the end 72 starts the initial piercing of the plate with the end 72 and the end wall 66 completing the striking out of the tang 32. At this precise moment, the shoulders 82 and 84 start to punch out the legs of the bifurcated tooth 30 and the shoulders with the cooperation of the beveled edges 68 of the end wall 66 complete the striking out of the legs.

It can be appreciated that the tang is formed first and than, following closely on the formation of the tang and with the further movement of the same punch, the bifurcated tooth is formed and the tang and bifurcated tooth are structurally related to each other, as shown in FIGS. 2–4. Because of the angular relationship between the end 72 and the shoulders 82 and 84 and the fact that the end is disposed at an angle of approximately 22" and the shoulders are disposed at an angle of approximately 26° to a plane passing transversely through the forming portion from the end wall 66 to the end wall 64, the tang and bifurcated tooth are struck out from the material of the plate, in quick successive fashion, without placing any stress on the plate portions surrounding the portion 20a and without weakening such surrounding portions. Also, the tang and bifurcated tooth are formed so that they extend perpendicularly from the plate in a sturdy fashion whereby they will not buckle, bend or break, when they are driven into a wood member.

Because of the beveled edges 68 and the beveled edge 78, the extremities or piercing ends or tips of the tang and the legs of the bifurcated tooth are inclined inwardly toward each other.

While the best known embodiment of the present invention has been described herein and illustrated in the attached drawings, it is understood that the invention is only to be limited in accordance with the spirit and scope of the appended claims.

What is claimed is:

1. A punch for use with a die for forming a connector plate having a struck out tooth unit composed of a cooperating and spaced parallel bifurcated tooth and a tang, said punch including a rectangular forming body portion having opposing flat side walls and opposing end walls, said body portion having a piercing and forming end portion of reduced thickness and having side walls spaced inwardly from the side walls of the body portion and defining therewith forming shoulders, said end portion having a free end disposed at an acute angle to one end wall of the body portion and said shoulders being inclined from said one end wall to the other end wall in the opposite direction to the free end and disposed at an acute angle to the other end wall.

2. The invention of claim 1, wherein said free end is formed at an angle of greater than 20° and less than 25° to a plane passing transversely through the body portion from one end wall to the other end wall and said shoulders are formed at an angle relative to said plane of greater than 25° and less than 30°.

3. The invention of claim 2, wherein the angle of the end is 22° and the angle of the shoulders is 26°.

4. The invention of claim 1, wherein said end and the one end wall are joined by a rounded heel.

5. The invention of claim 4, wherein said end wall is formed with beveled edges.

6. The invention of claim 1, wherein said forming end portion is formed with an end wall above one end of the end, said one end defining a piercing tip and said end wall having beveled side edges.

References Cited

UNITED STATES PATENTS

| 518,766 | 4/1894 | Plecker | 72—326 |
| 1,044,283 | 11/1912 | Stanger | 72—325 |
| 1,294,882 | 2/1919 | Dilks | 29—513 |
| 2,800,960 | 7/1957 | Cutler | 29—513 |
| 2,800,961 | 7/1957 | Cutler | 72—332 |
| 3,094,158 | 6/1963 | Reid | 72—325 |

CHARLES W. LANHAM, Primary Examiner

E. M. COMBS, Assistant Examiner

U.S. Cl. X.R.

72—325